US008419865B2

(12) United States Patent
Tarr et al.

(10) Patent No.: US 8,419,865 B2
(45) Date of Patent: Apr. 16, 2013

(54) HEAT RECOVERY SYSTEM FOR USE WITH A WASHING APPLIANCE

(75) Inventors: Ronald Scott Tarr, Louisville, KY (US); Rajesh Narayan Kulkarni, Karnataka (IN)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 13/105,556

(22) Filed: May 11, 2011

(65) Prior Publication Data
US 2012/0047961 A1    Mar. 1, 2012

(51) Int. Cl.
*B08B 3/00* (2006.01)
(52) U.S. Cl.
USPC .................. 134/56 D; 134/57 D; 134/58 D
(58) Field of Classification Search .............. 134/56 D, 134/57 D
See application file for complete search history.

(56) References Cited

U.S. PATENT DOCUMENTS

| 4,256,170 A | 3/1981 | Crump |
| 4,326,551 A | 4/1982 | Voorhees |
| 4,588,026 A | 5/1986 | Hapgood |
| 5,660,193 A | 8/1997 | Archer et al. |
| 5,768,730 A * | 6/1998 | Matsumoto et al. ............. 8/159 |
| 5,791,401 A | 8/1998 | Nobile |
| 5,792,276 A | 8/1998 | Driessen |
| 6,293,311 B1 | 9/2001 | Bushi et al. |

FOREIGN PATENT DOCUMENTS

WO    2004051168 A2    6/2004

OTHER PUBLICATIONS

Persson, Tomas. Dishwasher and washing machine heated by a hot water circulation loop. Solar Energy Research Center SERC, Högskolan Dalarna, 781 88 Borlänge, Sweden; accepted May 6, 2006. vol. 27, Issue 1, Jan. 2007, pp. 120-128.

* cited by examiner

*Primary Examiner* — Michael Barr
*Assistant Examiner* — Jason Ko
(74) *Attorney, Agent, or Firm* — Global Patent Operation (57) ABSTRACT

A heat recovery system for use with a washing appliance having a tub includes a heat exchanger having a first tube and a second tube extending through the first tube such that the first tube and the second tube are substantially concentric. A first end connector is configured to couple to a first end portion of the first tube and a first end portion of the second tube. The first end connector is formed as one-piece and includes a first connection portion configured to couple in flow communication with the first tube, and a second connection portion configured to couple in flow communication with the second tube.

19 Claims, 5 Drawing Sheets

HEAT RECOVERY SYSTEM FOR USE WITH A WASHING APPLIANCE

BACKGROUND OF THE INVENTION

1. Field of the Invention

The embodiments described herein relate generally to a heat exchanger for use with a washing appliance and, more particularly, to a heat exchanger having a one-piece end connector.

2. Description of Related Art

In known washing appliances, such as dishwashers, warm, clean water is supplied to the appliance and warm, fouled water is drained from the appliance. At least some known washing appliances are coupled to a water heater that is configured to heat the incoming clean water transported to a building or other structure to a predetermined temperature before the water is channeled into a tub to perform a wash cycle. In such an appliance, the warmed, fouled water is drained from the tub after the wash cycle. At least one known appliance uses the warmed, fouled water to heat the incoming cool, clean water in a tube-in-tube heat exchanger. In such an appliance, the warmed, fouled water is drained into a holding tank. As cool, clean water is supplied to the tub, the fouled water is drained from the holding tank to pre-heat the clean water. However, residue from the fouled water may accumulate in the holding tank.

One known tube-in-tube heat exchanger includes a complex coupling system at each end of the heat exchanger to maintain separate flows through the heat exchanger. The coupling system of the known heat exchanger includes a plurality of inner tubes, threaded components, brazed components, and other components. The plurality of inner tubes is relatively expensive as compared to washing appliances that do not include a tube-in-tube heat exchanger. The tubes can also accumulate residue therein because of their complex configurations and couplings. Further, at each of the couplings and/or joints, a leak may exist.

BRIEF SUMMARY OF THE INVENTION

In one aspect, a heat recovery system for use with a washing appliance having a tub is provided. The heat recovery system includes a heat exchanger having a first tube and a second tube extending through the first tube such that the first tube and the second tube are substantially concentric. A first end connector is configured to couple to a first end portion of the first tube and a first end portion of the second tube. The first end connector is formed as one-piece and includes a first connection portion configured to couple in flow communication with the first tube, and a second connection portion configured to couple in flow communication with the second tube.

In another aspect, a washing appliance is provided. The washing appliance includes a tub and a heat recovery system coupled in flow communication with the tub. The heat recovery system includes a heat exchanger configured to couple to a water supply line and a drain line. The heat exchanger includes a first tube and a second tube extending through the first tube such that the first tube and the second tube are substantially concentric. The heat recovery system further includes a first end connector coupled to a first end portion of the first tube and a first end portion of the second tube. The first end connector is formed as one-piece and includes a first connection portion configured to couple in flow communication with the first tube and the water supply, and a second connection portion configured to couple in flow communication with the second tube and the drain line.

In yet another aspect, a heat recovery system for use with a washing appliance having a tub is provided. The heat recovery system includes a heat exchanger configured to couple to a water supply line and a drain line. The heat exchanger includes a first tube and a second tube extending through the first tube such that the first tube and the second tube are substantially concentric. The heat recovery system further includes a first end connector configured to couple to a first end portion of the first tube and a first end portion of the second tube. The first end connector is formed as one-piece and includes a first connection portion configured to couple the first tube and the water supply line in flow communication, and a second connection portion configured to couple the second tube and the drain line in flow communication.

BRIEF DESCRIPTION OF THE SEVERAL VIEWS OF THE DRAWINGS

FIGS. 1-5 show exemplary embodiments of the apparatus and methods described herein.

DETAILED DESCRIPTION OF THE INVENTION

The embodiments described herein provide a heat recovery system for use with a washing appliance, such as a dishwasher. The heat recovery system includes a heat exchanger that warms incoming, cool clean water using outgoing, warmed fouled water. The heat exchanger described herein includes two concentric tubes to maintain separate clean and fouled flows while allowing heat exchange between the flows. An end connector is coupled to each end of the heat exchanger to channel water to and/or from the heat exchanger. Each end connector is configured substantially similarly and formed unitarily as one-piece. As such, manufacturing and/or assembly of the heat exchanger, heat recovery system, and/or washing appliance is simplified compared to heat exchangers having an assembly of connectors at each end.

Figure 1:
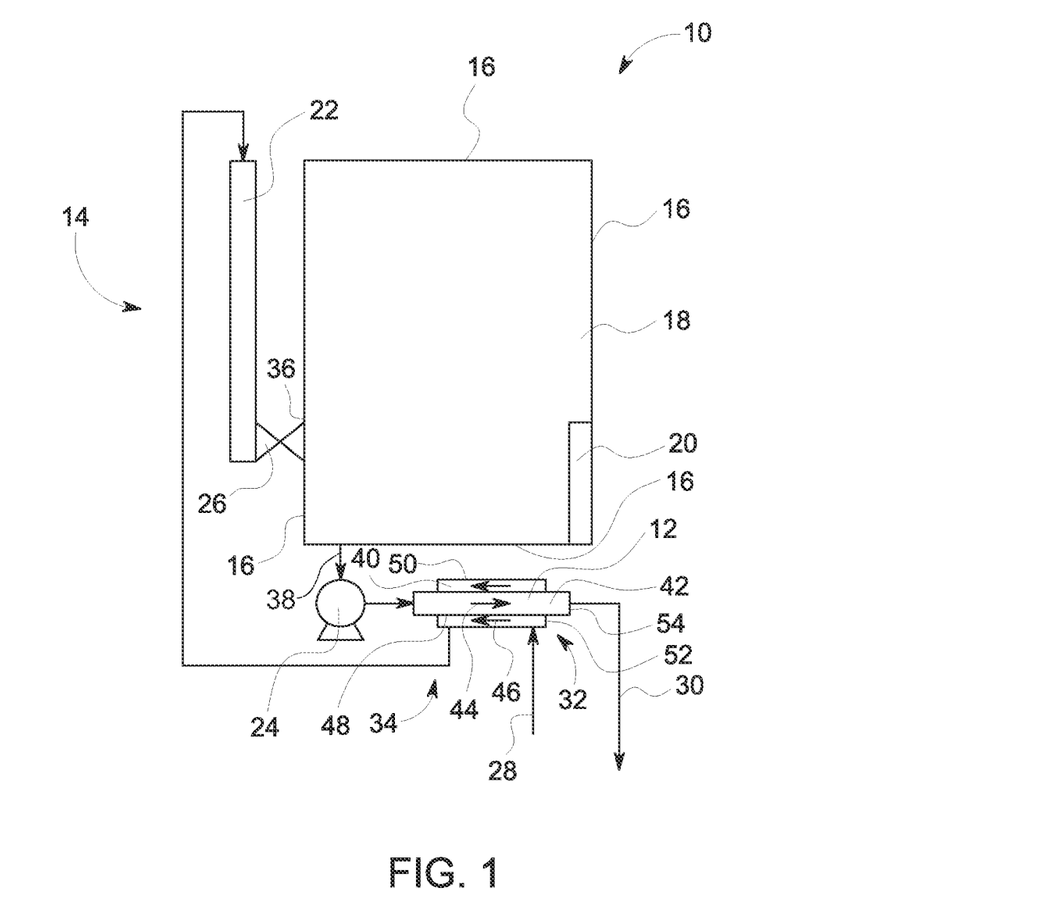
FIG. 1 is a schematic view of an exemplary washing appliance.
Figure 2:
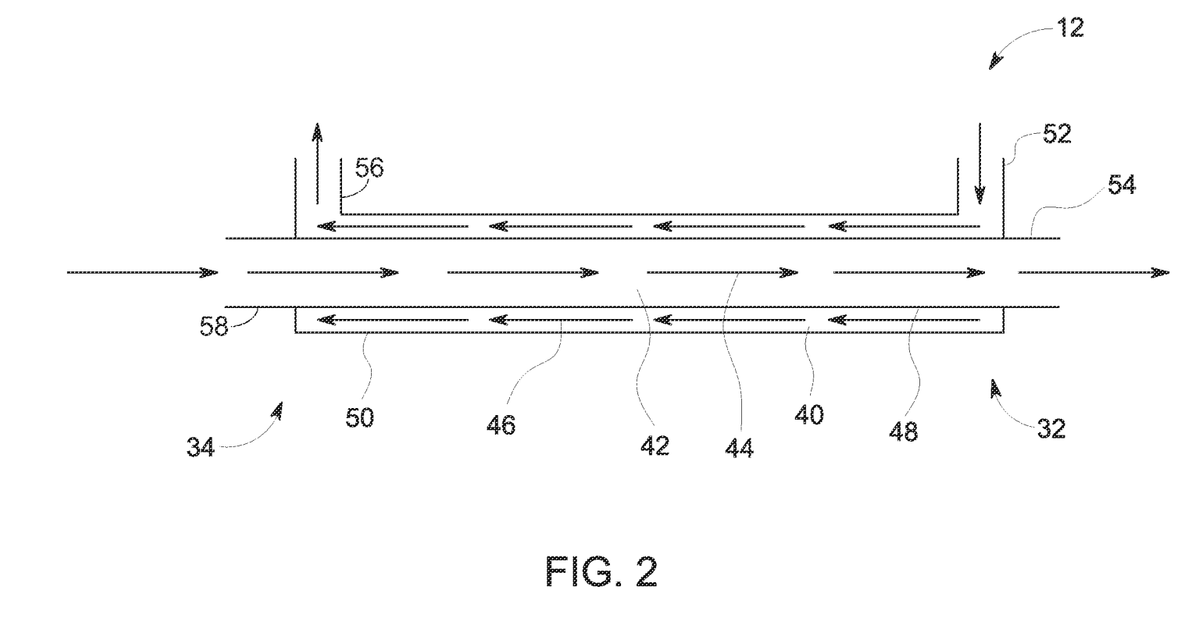
FIG. 2 is a schematic view of an exemplary heat exchanger that may be used with the washing appliance shown in FIG. 1.

FIG. 1 is a schematic view of an exemplary washing appliance 10. FIG. 2 is a schematic view of an exemplary heat exchanger 12 that may be used with washing appliance 10 (shown in FIG. 1). Washing appliance 10 is, for example, a dishwashing appliance; however, washing appliance 10 can be any suitable washing appliance that is supplied with cool, clean water and discharges heated, fouled water. In the exemplary embodiment, washing appliance 10 includes a heat recovery system 14 and walls 16 defining a tub 18. More specifically, heat recovery system 14 is coupled in flow communication with tub 18, as described in more detail below. A heating element 20 is positioned within tub 18 and is configured to further heat water within tub 18. In an alternative embodiment, heating element 20 is positioned within heat recovery system 14 rather than being positioned within tub 18. Alternatively, washing appliance 10 does not include heating element 20.

Heat recovery system 14 includes heat exchanger 12, a holding tank 22, a pump 24, and a flow control device 26. As an alternative to pump 24, heat recovery system 14 includes a valve (not shown). In the exemplary embodiment, heat exchanger 12 is coupled to tub 18, a water supply line 28, and a drain line 30. More specifically, a first end portion 32 of heat exchanger 12 is coupled to supply line 28 and drain line 30, and a second end portion 34 of heat exchanger 12 is coupled to tub 18. In the exemplary embodiment, heat exchanger 12 is coupled to an inlet 36 of tub 18 via holding tank 22 and to an outlet 38 of tub 18 via pump 24. Further, heat exchanger 12 includes a first tube 40 and a second tube 42 extending through first tube 40 such that first tube 40 and second tube 42 are substantially concentric with each other. Although tubes 40 and 42 are referred to herein, it should be understood that any suitable component for channeling liquids can be used as tubes 40 and/or 42. As such, tubes 40 and 42 are not limited to substantially cylindrical components. In the exemplary embodiment, tubes 40 and 42 are configured to transfer heat from fouled water 44 to clean water 46 through a wall 48 of second tube 42. Further, in the exemplary embodiment, a wall 50 of first tube 40 is insulated to prevent heat transfer with the environment.

A first end portion 52 of first tube 40 is coupled in flow communication with supply line 28 and a first end portion 54 of second tube 42 is coupled in flow communication with drain line 30. In an alternative embodiment, first end portion 52 of first tube 40 is coupled in flow communication with drain line 30 and first end portion 54 of second tube 42 is coupled in flow communication with supply line 28. In the exemplary embodiment, at second end portions 56 and 58, respectively, first tube 40 is coupled in flow communication with holding tank 22 and second tube 42 is coupled in flow communication with pump 24. In the alternative embodiment, second end portion 56 of first tube 40 is coupled in flow communication with pump 24, and second end portion 58 of second tube 42 is coupled in flow communication with holding tank 22.

Holding tank 22 is coupled in flow communication with inlet 36 of tub 18 via flow control device 26. Holding tank 22 is configured to store warmed, clean water 46 from heat exchanger 12 to prevent clean water 46 from mixing with fouled water 44 within tub 18. More specifically, flow control device 26 is configured to accumulate and/or retain clean water 46 in holding tank 22 while pump 24 drains fouled water 44 from tub 18 into heat exchanger 12. When a drain cycle is completed, flow control device 26 allows clean water 46 to flow from holding tank 22 into tub 18. As such, flow control device 26 is configured to control a flow of water 46 from holding tank 22 into tub 18.

Figure 3:
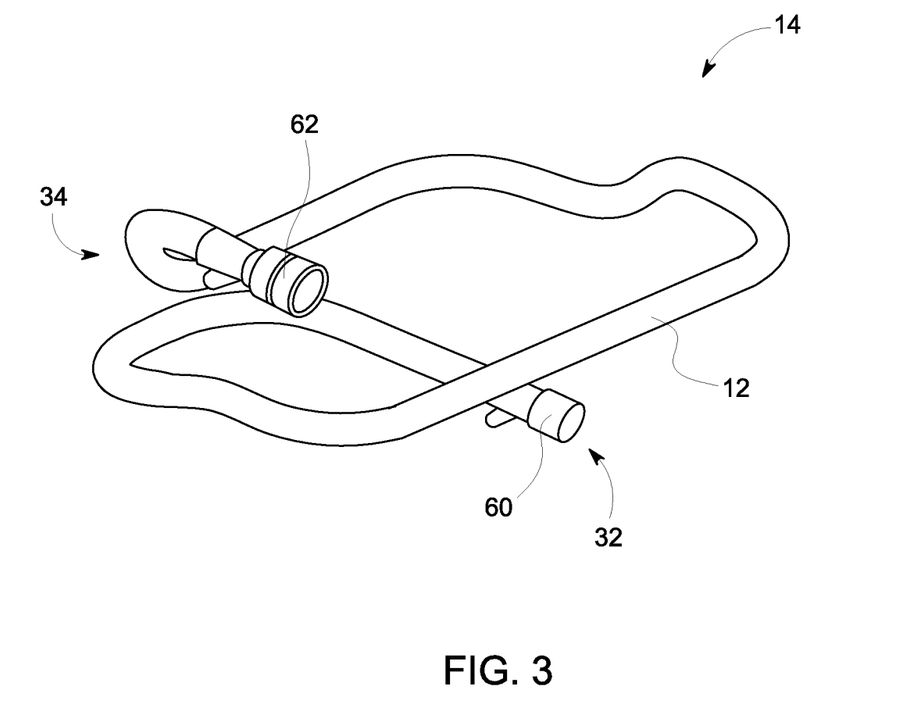
FIG. 3 is a perspective view of the heat exchanger shown in FIG. 2.
Figure 4:
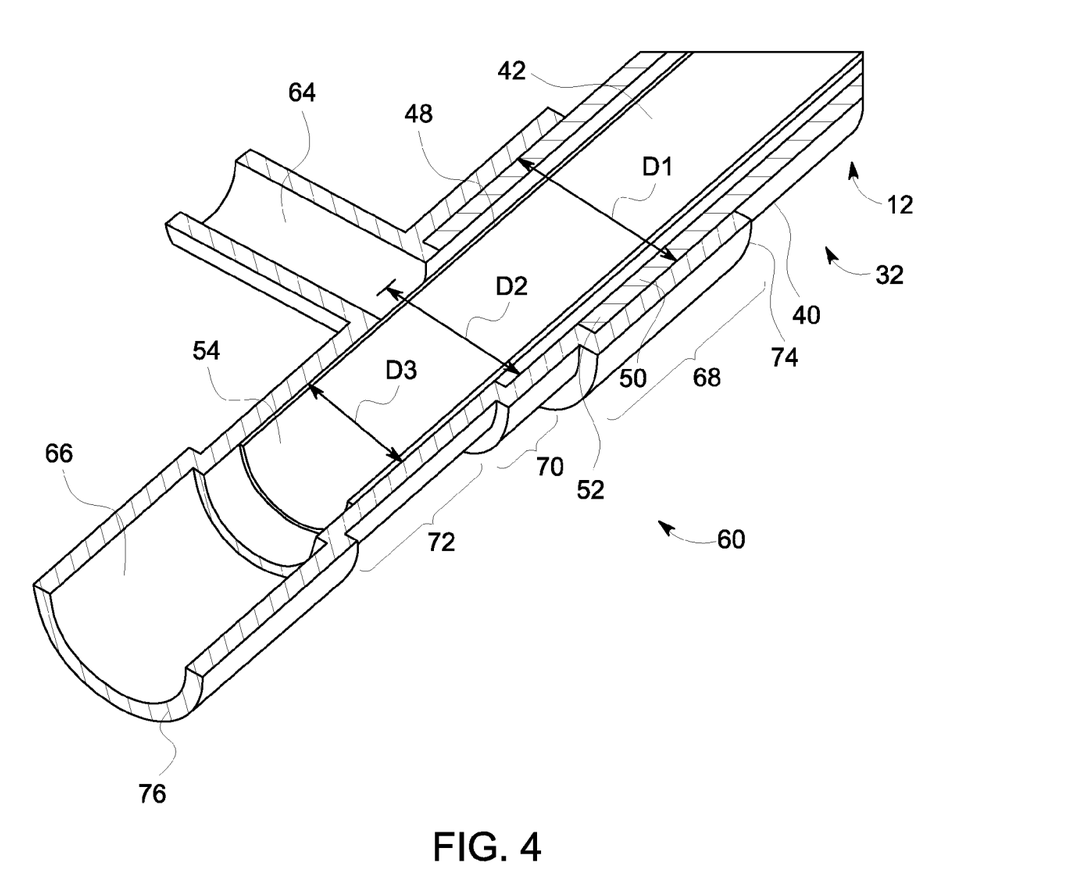
FIG. 4 is a cross-sectional view of an exemplary end connector that may be used with the heat exchanger shown in FIGS. 2 and 3.

FIG. 3 is a perspective view of heat exchanger 12. FIG. 4 is a cross-sectional view of an exemplary end connector 60 that may be used with heat exchanger 12 and/or heat recovery system 14 (shown in FIG. 1). Heat recovery system 14 includes a first end connector 60 coupled to first end portion 52 of first tube 40 and first end portion 54 of second tube 42. Similarly, a second end connector 62 is coupled to second end portion 56 of first tube 40 and second end portion 58 of second tube 42. Second end connector 62 is substantially similar to first end connector 60 and, as such, first end connector 60 is described herein for the sake of clarity. However, it should be understood that the description of first end connector 60 applies to second end connector 62 unless otherwise noted.

In the exemplary embodiment, end connector 60 is formed unitarily as one piece by, for example, molding end connector 60 as one-piece. More specifically, each component of end connector 60 is formed integrally as one-piece. For example, to form end connector 60 integrally as one-piece, second tube 42 is positioned within first tube 40 and a location of each tube 40 and 42 is defined in a fixture (not shown). End connector 60 is then molded about tubes 40 and 42 within the fixture. Alternatively, end connector 60 is molded separately from tubes 10 and 42 and interference fit with tubes 40 and 42. A clamp (not shown) can be coupled about end connector 60 in higher pressure application, such as applications in which the fluid pressure is above about 10 pounds per square inch (psi).

End connector 60 includes a first connection portion 64 and a second connection portion 66 formed integrally as one-piece. First connection portion 64 is configured to couple in flow communication with first tube 40, and second connection portion 66 is configured to couple in flow communication with second tube 42. Alternatively, first connection portion 64 (shown in FIG. 4) is configured to couple in flow communication with second tube 42, and second connection portion 66 is configured to couple in flow communication with first tube 40. For the sake of clarity, the exemplary embodiment will be described in detail herein below. However, it should be understood that fouled water 44 could be channeled through first tube 40 and clean water 46 could be channeled through second tube 42.

In the exemplary embodiment, first connection portion 64 of first end connector 60 can also be referred to as a first water inlet, and second connection portion 66 of first end connector 60 can also be referred to as a first water outlet. Further, first connection portion 64 of second end connector 62 can be referred to as a second water outlet, and second connection portion 66 of second end connector 62 can be referred to as a second water inlet. More specifically, first connection portion 64 of first end connector 60 is configured to couple first tube 40 and water supply line 28 (shown in FIG. 1) in flow communication, and second connection portion 66 of first end connector 60 is configured to couple second tube 42 and drain line 30 (shown in FIG. 1) in flow communication. First connection portion 64 of second end connector 62 is configured to couple first tube 40 and inlet 36 (shown in FIG. 1) of tub 18 (shown in FIG. 1) in flow communication, and second connection portion 66 of second end connector 62 is configured to couple second tube 42 and outlet 38 (shown in FIG. 1) of tub 18 in flow communication.

Referring again to first end connector 60 for the sake of clarity, end connector 60 includes a coupling sleeve 68, a passage portion 70, and a coupling portion 72 formed integrally as one-piece with first connection portion 64 and second connection portion 66. In the exemplary embodiment, coupling sleeve 68, passage portion 70, coupling portion 72, and second connection portion 66 are formed integrally in series from a first end 74 of end connector 60 to a second end 76 of end connector 60. First connection portion 64 extends from passage portion 70 and, as such, first connection portion 64 is in flow communication with passage portion 70. In a particular embodiment, first connection portion 64 is substantially perpendicular to coupling sleeve 68, passage portion 70, coupling portion 72, and/or second connection portion 66. Alternatively, first connection portion 64 is oriented at any suitable angle with respect to coupling sleeve 68, passage portion 70, coupling portion 72, and/or second connection portion 66. In the exemplary embodiment, passage portion 70 is in flow communication with first tube 40 within coupling sleeve 68.

An inner diameter $D_1$ of coupling sleeve 68 is larger than an inner diameter $D_2$ of passage portion 70, which is larger than an inner diameter $D_3$ of coupling portion 72. Second connection portion 66 has any suitable diameter. In the exemplary embodiment, inner diameter $D_1$ is selected such that coupling sleeve 68 can receive first tube 40 and second tube 42 therein. In a particular embodiment, inner diameter $D_1$ is approximately equal to an outer diameter of first tube 40. As such, coupling sleeve 68 is configured to couple about first tube 40 and second tube 42 to couple end connector 60 to heat exchanger 12. Inner diameter $D_2$ is selected to enable a flow of liquid about second tube 42 into and/or out of first tube 40. As such, passage portion 70 is configured to provide flow communication between first tube 40 and first connection portion 64. Inner diameter $D_1$ is selected to enable coupling portion 72 to couple about second tube 42 without allowing a flow of water from passage portion 70 into coupling portion 72. In a particular embodiment, inner diameter $D_1$ is approximately equal to an outer diameter of second tube 42. As such, coupling portion 72 is configured to couple second tube 42 in flow communication with second connection portion 66.

Because coupling portion 72 is in series with coupling sleeve 68 and passage portion 70, end portion 54 of second tube 42 extends beyond end portion 52 of first tube 40 when heat exchanger 12 is coupled to end connector 60. Further, coupling portion 72 is configured to extend beyond end portion 54 of second tube 42 to account for manufacturing tolerances of end connector 60 and/or assembly tolerances when coupling second tube 42 within coupling portion 72. In the exemplary embodiment, end connector 60 is formed from a non-metallic material, such as a plastic, rubber, santoprene, and/or any other suitable material. Further, first tube 40 is formed from plastic, polyvinyl chloride (PVC), nylon, polyethylene, and/or any other suitable material, such as a material that facilitates preventing heat transfer from a flow in first tube 40 to the environment. Second tube 42 is formed from a metallic material, copper, aluminum, steel, stainless steel, and/or any other suitable material that enables heat transfer between a flow in second tube 42 and a flow in first tube 40. Moreover, in the exemplary embodiment, first tube 40 is sealed to end connector 60 at coupling sleeve 68, and second tube 42 is sealed to end connector 60 at coupling portion 72. Alternatively, first tube 40 and/or second tube 42 is coupled to end connector 60 other than by sealing. For example, first tube 40 and/or second tube 42 is adhered, fastened, and/or otherwise coupled to end connector 60.

Referring to FIGS. 1-4, during use of washing appliance 10, cool clean water 46 is supplied to tub 18 via heat exchanger 12. When a predetermined amount of water 46 is supplied to tub 18, clean water 46 is prevented from being channeled into heat exchanger 12 through supply line 28. Water within tub 18 is heated to a predetermined temperature using heating element 20. At an end of the wash cycle, warm fouled water 44 is drained from tub 18 by pump 24. From pump 24, fouled water 44 is channeled into second tube 12 of heat exchanger 12 while additional clean water 46 is channeled through first tube 40 into holding tank 22. Warmed, clean water 46 accumulates in holding tank 22 as tub 18 continues to drain fouled water 44 to heat exchanger 12. Fouled water 41 is channeled from heat exchanger 12 to drain line 30 for discharge. When fouled water 44 has been drained from tub 18, flow control device 26 allows warmed clean water 46 to be channeled into tub 18. As such, clean and fouled water are prevented from mixing in tub 18. Warm water in tub 18 is heated by heating element 20 if warm clean water is cooler than the predetermined temperature. During a first wash cycle, heating element 20 may be operated at a higher temperature and/or for a longer time period, as compared to subsequent wash cycles in which warm clean water is supplied to tub 18.

Figure 5:
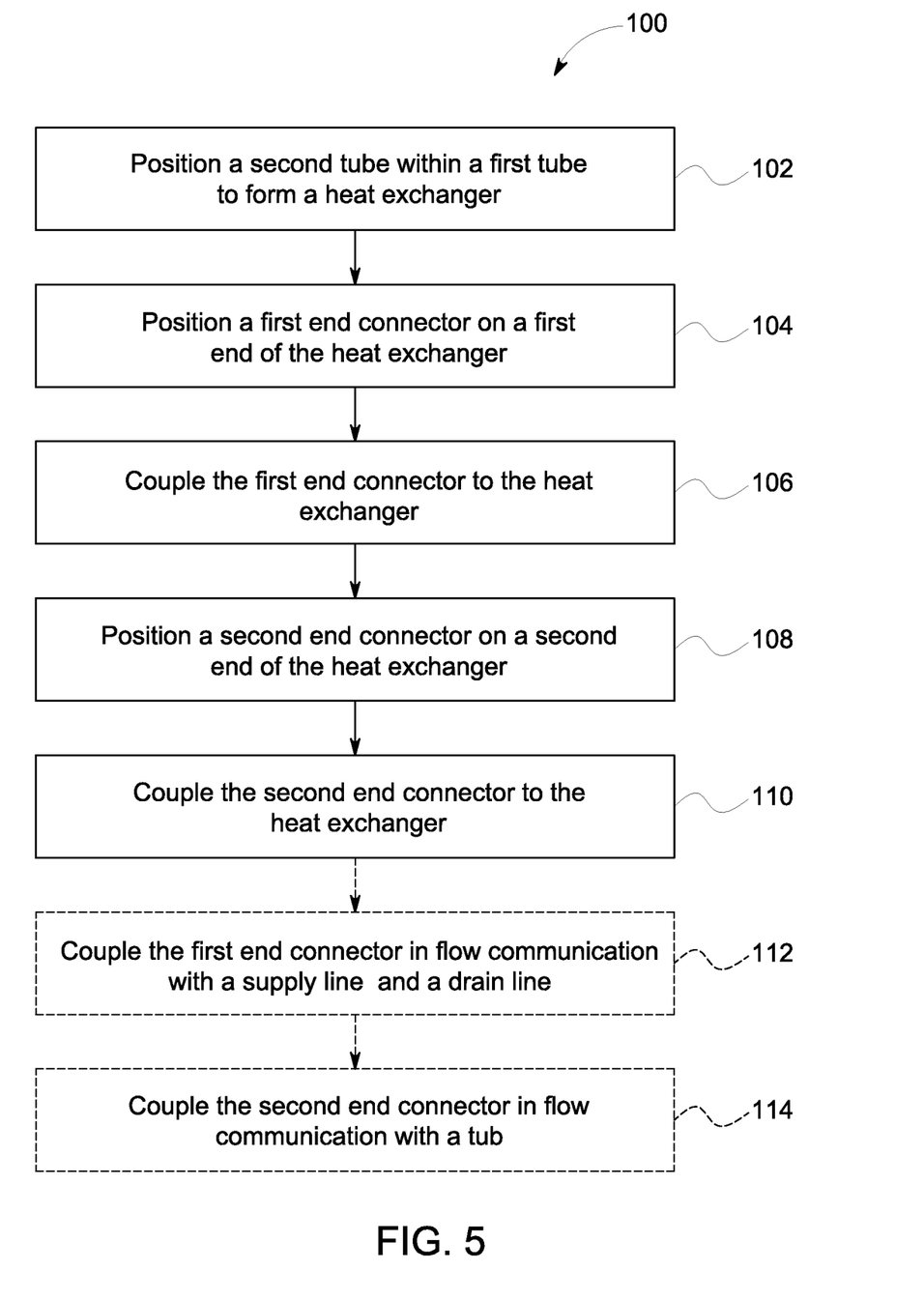
FIG. 5 is a flowchart of an exemplary method of assembling the dishwasher shown in FIGS. 1-4.

FIG. 5 is a flowchart of an exemplary method 100 of assembling, making, and/or otherwise manufacturing washing appliance 10 (shown in FIGS. 1-4). Referring to FIGS. 1-5, method 100 includes positioning 102 second tube 42 within first tube 40 to form heat exchanger 12. In the exemplary embodiment, second tube 42 is longer than first tube 40 such that end portions 54 and 58 of second tube 42 extend beyond end portions 52 and 56 of first tube 40. First end connector 60 is positioned 104 on first end portion 32 of heat exchanger 12. More specifically, first end connector 60 is positioned 104 such that coupling sleeve 68 is contact with, and/or proximate to, first tube 40 and coupling portion 72 is contact with, and/or proximate to, second tube 42. First end connector 60 is coupled 106 to heat exchanger 12. More specifically, first tube 40 is coupled 106 to first end connector 60 at coupling sleeve 68, and second tube 42 is coupled 106 to first end connector 60 at coupling portion 72. In the exemplary embodiment, first tube 40 is sealed and/or molded to coupling sleeve 68, and second tube 42 is sealed and/or molded to coupling portion 72.

Similarly, second end connector 62 is positioned 108 on second end portion 34 of heat exchanger 12. More specifically, second end connector 62 is positioned 108 such that coupling sleeve 68 is contact with, and/or proximate to, first tube 40 and coupling portion 72 is contact with, and/or proximate to, second tube 42. Second end connector 62 is coupled 110 to heat exchanger 12. More specifically, first tube 41) is coupled 110 to second end connector 62 at coupling sleeve 68, and second tube 42 is coupled 110 to second end connector 62 at coupling portion 72.

First end connector 60 is coupled 112 in flow communication with supply line 28 and drain line 30. More specifically, first connection portion 64 is coupled 112 in flow communication with supply line 28, and second connection portion 66 is coupled 112 in flow communication with drain line 30. Alternatively, first connection portion 64 is coupled 112 in flow communication with drain line 30, and second connection portion 66 is coupled 112 in flow communication with supply line 28. Further, in the exemplary embodiment, second end connector 62 is coupled 114 in flow communication with tub 18. More specifically, first connection portion 64 is coupled 114 in flow communication with holding tank 22, and second connection portion 66 is coupled 114 in flow communication with pump 24. Alternatively, first connection portion 64 is coupled 114 in flow communication with pump 24, and second connection portion 66 is coupled 114 in flow communication with holding tank 22.

The embodiments described herein provide a washing appliance that can be coupled to a cool or cold water supply, rather than a warm or hot water supply. As such, the washing appliance substantially eliminates heat losses due to channeling warm water into the washing appliance from a remote water heater. Further, the herein-described heat recovery system uses warmed, fouled water to heat cool, clean water to reduce heating within the washing appliance by a heating element. Moreover, the warmed clean water is retained within a holding tank, rather than warmed fouled water being retained in a holding tank, which facilitates preventing residue from accumulating within the washing appliance.

The heat exchanger described herein includes an outer tube and a relatively large inner tube, as compared to known heat exchangers having a plurality of smaller inner tubes within an outer tube. As such, the two tubes described herein facilitates preventing accumulation of residue within the heat exchanger because residue can pass through the larger inner and outer tubes. Further, the herein-described end connector is formed as one-piece to facilitate reducing possible leak locations. More specifically, the end connector is coupled to a first tube at a first coupling and coupled to a second tube at a second coupling. The end connector includes two other couplings. As such, the end connector includes fewer coupling locations compared to known complex coupling systems within tube-in-tube heat exchangers. Moreover, the end connector provides for manufacturing and/or assembly tolerances.

Exemplary embodiments of a heat recovery system for use with a washing appliance are described above in detail. The methods and apparatus are not limited to the specific embodiments described herein, but rather, components of apparatus and/or steps of the methods may be utilized independently and separately from other components and/or steps described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A heat recovery system for use with a washing appliance having a tub, said heat recovery system comprising:
    a heat exchanger comprising a first tube and a second tube, the second tube extending through said first tube such that said first tube and said second tube are substantially concentric; and
    a first end connector configured to couple to a first end portion of said first tube and a first end portion of said second tube, said first end connector formed as one-piece and comprising:
        a first connection portion configured to couple in flow communication with said first tube;
        a second connection portion configured to couple in flow communication with said second tube; and
        a coupling portion defined between said first connection portion and said second connection portion,
        wherein said coupling portion is configured to couple said second tube in flow communication with said second connection portion, and wherein said coupling portion is configured to extend axially beyond said first end portion of said second tube toward said second connection portion.

2. A heat recovery system in accordance with claim 1, wherein said first connection portion is coupled to said first tube by sealing said first connection portion to said first tube, and said second connection portion is coupled to said second tube by sealing said second connection portion to said second tube.

3. A heat recovery system in accordance with claim 1, wherein said first end connector further comprises a coupling sleeve configured to couple about said first tube and said second tube.

4. A heat recovery system in accordance with claim 3, wherein said first end connector further comprises a passage portion defined between said first connection portion and said coupling sleeve, said passage portion configured to provide flow communication between said first tube and said first connection portion.

5. A heat recovery system in accordance with claim 1, further comprising a second end connector coupled to a second end portion of said first tube and a second end portion of said second tube, said second end connector formed as one-piece and comprising:
    said first connection portion coupled in flow communication with said first tube; and
    said second connection portion coupled in flow communication with said second tube.

6. A heat recovery system in accordance with claim 5, wherein said second end connector further comprises:
    a coupling sleeve configured to couple about said first tube and said second tube;
    a passage portion defined, between said third connection portion and said coupling sleeve, said passage portion configured to provide flow communication between said first tube and said third connection portion; and
    a coupling portion defined between said third connection portion and said fourth connection portion, said coupling portion configured to couple said second tube in flow communication with said fourth connection portion.

7. A washing appliance, comprising:
a tub; and
a heat recovery system coupled in flow communication with said tub, said heat recovery system comprising:
    a heat exchanger configured to couple to a water supply line and a drain line, said heat exchanger comprising a first tube and a second tube, the second tube extending through said first tube such that said first tube and said second tube are substantially concentric; and
    a first end connector coupled to a first end portion of said first tube and a first end portion of said second tube, said first end connector formed as one-piece and comprising:
        a first connection portion configured to couple in flow communication with said first tube and the water supply;
        a second connection portion configured to couple in flow communication with said second tube and the drain line; and
        a coupling portion defined between said first connection portion and said second connection portion,
        wherein said coupling portion is configured to couple said second tube in flow communication with said second connection portion, and wherein said coupling portion is configured to extend axially beyond said first end portion of said second tube toward said second connection portion.

8. A washing appliance in accordance with claim 7, further comprising a heating element positioned within said tub.

9. A washing appliance in accordance with claim 7, further comprising a second end connector coupled to a second end portion of said first tube and a second end portion of said second tube, said second end connector formed as one-piece and comprising:
    said first connection portion coupled in flow communication with said first tube and an inlet of said tub; and
    said second connection portion coupled in flow communication with said second tube and an outlet of said tub.

10. A washing appliance in accordance with claim 7, further comprising a holding tank coupled in flow communication between said tub and said first tube of said heat exchanger.

11. A washing appliance in accordance with claim 10, further comprising a flow control device coupled between said holding tank and said tub, said flow control device configured to control a flow of water from said holding tank into said tub.

12. A washing appliance in accordance with claim 7, further comprising a pump coupled in flow communication between said tub and said second tube of said heat exchanger, said pump configured to channel heated drain water from said tub to said heat exchanger.

13. A heat, recovery system for use with a washing appliance having a tub, said heat recovery system comprising:
- a heat exchanger configured to couple to a water supply line and a drain line, said heat exchanger comprising a first tube and a second tube, the second tube extending through said first tube such that said first tube and said second tube are substantially concentric; and
- a first end connector configured to couple to a first end portion of said first tube and a first end portion of said second tube, said first end connector formed as one-piece and comprising:
  - a first connection portion configured to couple said first tube and the water supply line in flow communication;
  - a second connection portion configured to couple said second tube and the drain line in flow communication; and
  - a coupling portion defined between said first connection portion and said second connection portion,
  - wherein said coupling portion is configured to couple said second tube in flow communication with said second connection portion, and wherein said coupling portion is configured to extend axially beyond said first cud portion of said second tube toward said second connection portion.

14. A heat recovery system in accordance with claim 13, wherein the first end portion of said second tube extends beyond the first end portion of said first tube.

15. A heat recovery system in accordance with claim 13, further comprising a second end connector configured to couple to a second end portion of said first tube and a second end portion of said second tube, said second end connector formed as one-piece and comprising:
- said first connection portion configured to couple said first tube and an inlet of the tub in flow communication; and
- said second connection portion configured to couple said second tube anal an outlet of the tub in flow communication.

16. A heat recovery system in accordance with claim 13, further comprising a holding tank configured to couple in flow communication between the tub and said first tube of said heat exchanger.

17. A heat recovery system in accordance with claim 16, further comprising a flow control device coupled between said holding tank and the tub, said flow control device configured to control a flow of water from said holding tank into the tub.

18. A heat recovery system in accordance with claim 13, further comprising a pump configured to couple in flow communication between the tub and said second tube of said heat exchanger.

19. A heat recovery system in accordance with claim 13, wherein said first tube is formed from a plastic material, said second tube is formed from a metallic material, and said first end connector is formed from a non-metallic material.

* * * * *

UNITED STATES PATENT AND TRADEMARK OFFICE
CERTIFICATE OF CORRECTION

PATENT NO. : 8,419,865 B2  
APPLICATION NO. : 13/105556  
DATED : April 16, 2013  
INVENTOR(S) : Tarr et al.

Page 1 of 1

It is certified that error appears in the above-identified patent and that said Letters Patent is hereby corrected as shown below:

In the Specifications:

In Column 3, Line 12, delete "41)" and insert -- 40 --, therefor.

In Column 3, Line 17, delete "41)" and insert -- 40 --, therefor.

In Column 3, Line 29, delete "12" and insert -- 42 --, therefor.

In Column 3, Line 34, delete "21." and insert -- 24. --, therefor.

In Column 4, Line 6, delete "10" and insert -- 40 --, therefor.

In Column 5, Line 10, delete "$D_1$" and insert -- $D_3$ --, therefor.

In Column 5, Line 13, delete "$D_1$" and insert -- $D_3$ --, therefor.

In Column 5, Line 26, delete "aplastic," and insert -- a plastic, --, therefor.

In Column 5, Line 50, delete "12" and insert -- 42 --, therefor.

In Column 5, Line 55, delete "41" and insert -- 44 --, therefor.

In Column 6, Line 25, delete "41)" and insert -- 40 --, therefor.

In the Claims:

In Column 8, Line 17, in Claim 6, delete "defined," and insert -- defined --, therefor.

In Column 9, Line 11, in Claim 13, delete "heat," and insert -- heat --, therefor.

In Column 9, Line 32, in Claim 13, delete "cud" and insert -- end --, therefor.

In Column 10, Line 13, in Claim 15, delete "anal" and insert -- and --, therefor.

Signed and Sealed this  
Sixteenth Day of July, 2013

Teresa Stanek Rea  
*Acting Director of the United States Patent and Trademark Office*